Sept. 19, 1967   C. H. MANSFIELD ET AL   3,341,918
BURR REMOVING BROACH AND METHOD OF BROACHING
Filed Aug. 2, 1965
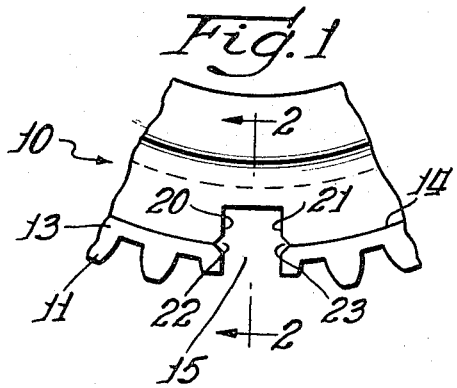
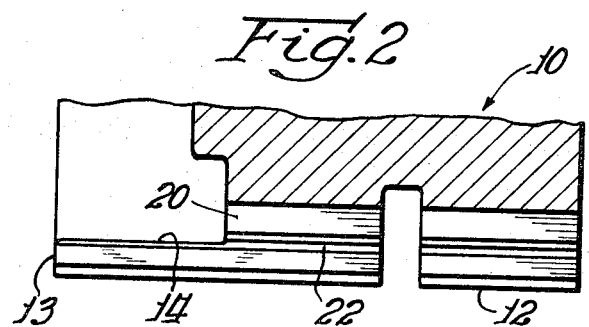
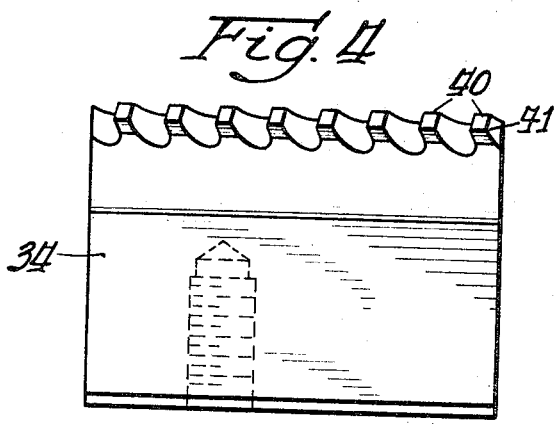
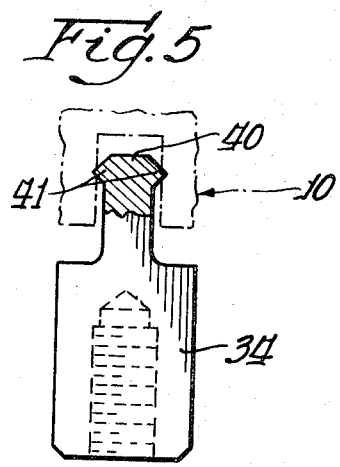
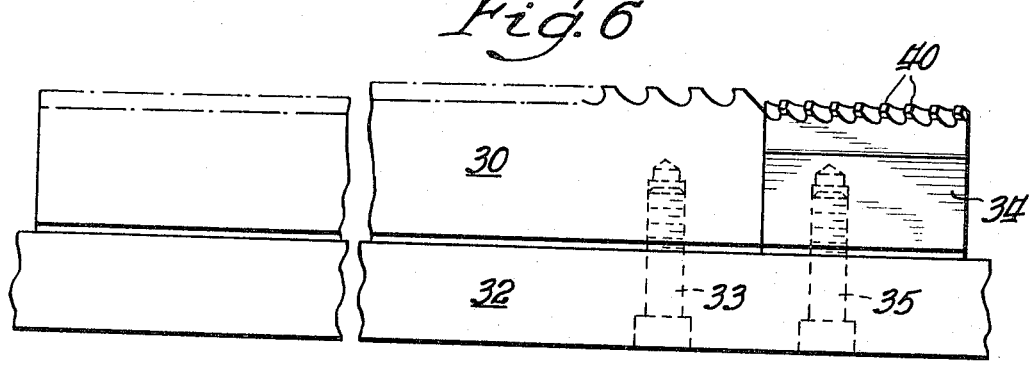
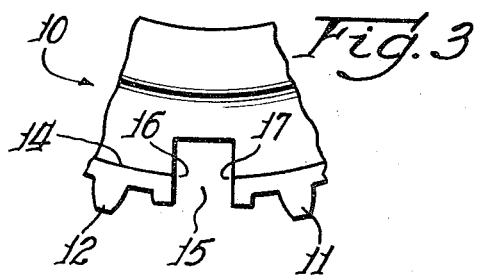
Inventors
Chester G. Blighton
Clarence H. Mansfield
By: Robert L. Zieg   Atty

United States Patent Office 3,341,918
Patented Sept. 19, 1967

3,341,918
BURR REMOVING BROACH AND METHOD OF BROACHING
Clarence H. Mansfield and Chester G. Blighton, Muncie, Ind., assignors to Borg-Warner Corporation, Chicago, Ill., a corporation of Illinois
Filed Aug. 2, 1965, Ser. No. 476,591
5 Claims. (Cl. 29—95.1)

This invention relates to broaches and the process of using same to manufacture a part.

It is a more particular object of the invention to provide an improved broaching tool for a cylinder part having an axial slot cut in its outer annular surface and having a counter-bored cup-shaped end portion including an inner annular surface. The broach includes means to cut the axial slot in the outer annular surface and means to form grooves in the sidewalls of the slot corresponding in depth to the distance of the inner annular surface from he outer annular surface whereby burrs normally formed in the zone of the junctures of said slot with said inner annular surface as the slot is cut will be removed by the groove cutting means as a part of the broaching operation, thereby eliminating the necessity for a separate burring operation.

It is a further object of the invention to provide a process of manufacture of a part wherein burrs which are formed during the broaching operation of said part can be removed from the part during the broaching cycle by means attached to said broach without the necessity of any additional machining operations.

The invention consists of the novel constructions, arrangements and devices to be hereinafter described and claimed for carrying out the above stated objects and such other objects as will appear from the following description of a certain preferred embodiment illustrated in the accompanying drawings, wherein:

FIGURE 1 is a partial end view of the improved cylindrically shaped torque transmitting part of the present invention, FIGURE 2 is an axial sectional view taken along the line 2—2 of FIGURE 1, FIGURE 3 is a view similar to FIGURE 1 illustrating the known or old form of the cylindrical part, FIGURE 4 is a side view of the groove cutting section of a broaching tool, FIGURE 5 is an end view of the groove cutting portion of the broach illustrated with reference to the torque transmitting part during the cutting operation, and FIGURE 6 is a side view of a broach including an illustration of the groove cutting broach section illustrated in FIGURE 3.

Referring to FIGURES 1 and 2 a torque transmitting part 10 is illustrated of the type which may be used in transmissions and more particularly in synchronizers. The improved part 10 is illustrated in FIGURES 1 and 2 and the prior form of the part is illustrated in FIGURE 3.

The torque transmitting part 10 is a cylindrically shaped part, only a partial section of which is illustrated in FIGURE 2, which is the hub member of a synchronizer. For a more detailed view of part 10 reference may be had to Patent No. 2,221,900 to White et al. and to pending application Ser. No. 221,702, now Patent No. 3,197,000, of common assignee, which relate to synchronizer mechanisms and illustrate hub members such as part 10 of the present invention.

The torque transmitting part 10 has external teeth 11 thereon adapted to transmit torque to other parts of the transmission. The part has a non-continuous outer annular surface 12 generally defined by the end surfaces of the teeth 11. Prior to cutting of the teeth 11 the outer annular surface 12 would be uninterrupted.

One end of the part 10 has a generally cup-shaped configuration, the end being counter-bored, including an annular wall 13 having an inner annular surface 14. A plurality of axial slots 15 are cut in the surface of the torque transmitting part 10. Only one of these slots 15 is illustrated in the drawing although in the synchronizer structure three slots are cut equidistant around the periphery of the torque transmitting part. The slots 15 are adapted to receive thrust bars (not illustrated) which are effective during the synchronizing operation.

Referring to FIGURE 3 in which the previous or known structure is illustrated, when the slot 15 was broached a burr was formed at the junctures 16 and 17 of the inner annular surface 14 and the slot 15. The thrust bars as used in one type of improved synchronizer structure (which is illustrated in the above-mentioned application Ser. No. 221,702) have lugs thereon which must engage the inner annular surface 14. Therefore with the improved synchronizer structure being used, burrs may not be allowed to remain at the junctures 16 and 17 as was acceptable in the past since there will be an interference with the operation of the synchronizer.

The slots include sidewalls 20 and 21. The improved part 10 illustrated in FIGURES 1 and 2 includes axial grooves 22 and 23 formed in the sidewalls 20 and 21 respectively. The grooves preferably are V-shaped as illustrated in FIGURE 1.

The grooves 22 and 23 are formed in the sidewalls at a depth with relation to the outer annular surface 12 corresponding to the depth of the inner annular surface 14 from the outer annular surface 12. Since the grooves correspond in depth with the inner annular surface as is illustrated in FIGURE 1 the junctures of the slot 15 with the inner annular surface 14 illustrated as 16 and 17 in the previous structure illustrated in FIGURE 3 will be effectively chamfered or cut at approximately a 45° angle as illustrated in FIGURE 1 when the grooves 22 and 23 are formed in the part. Therefore the formation of the grooves 22 and 23 inherently produce a part which will be substantially free of burrs in a zone defined as the junctures 16 and 17 between the inner annular surface 14 and the slot 15.

In FIGURE 6 the broach 30 is illustrated which includes a series of teeth of increasing height. The teeth increase in height from left to right as viewed in FIGURE 6. The teeth will be effective to cut a slot 15 in the torque transmitting part 10 as the broach 30 is moved across the surface of the part. The broach 30 is held to a moving platen 32 of the broach machine (not illustrated) by bolts 33. The improved broach of the present invention includes a removable broach section 34 illustrated in FIGURES 4, 5 and 6 which can be mounted to the platen 32 by bolts 35 and thereby secured directly behind the slot broach 30.

The broach section 34 includes a series of teeth 40 with V-shaped cutting portions 41 thereon which extend horizontally from the part on either side thereof as illustrated in FIGURE 5. The portions 41 being V-shaped and having cutting surfaces ground thereon are effective to cut the grooves 22 and 23 in the torque transmitting part 10. In FIGURE 5 the position of the broach section 34 is illustrated as it is cutting the grooves 22 and 23 in the part 10.

Due to the construction and operation of the broaching equipment used in the slot broaching operation, the addition of the broach section 34 to cut the grooves 22 and 23 does not add to the machine cycle time for manufacturing the slot. Therefore, applicants have provided a novel and improved broach structure for the slot 15 which is effective to make the junctures 16 and 17 free of burrs, thereby eliminating the necessity for a separate burring operation while at the same time not increasing machining time.

From the above it will be apparent that an improved process of manufacture of the part 10 has been disclosed which comprises a broach by the surface of the part 10, the broach including means to cut grooves in the sidewalls of the slots in the part to thereby insure that the part will be free of burrs in the zone of the junctures of the inner annular surface 14 and the slots 15.

Further, applicants have provided an improved torque transmitting part 10 with the inclusion of grooves 22 and 23 in the slots 15, the formation of the grooves 22 and 23 in the slots inherently producing a part which is free of burrs in the zones defined by the junctures of surface 14 and slot 15.

Thus it will be seen that applicants' invention will be useful in insuring that a part having the general shape of torque transmitting part 10 including a counterbored end section having an anular wall and axial slots formed in the surface of the part will be free of burrs at the juncture of the inner annular surface of the counter-bored section with the axial slots formed therein.

We wish it to be understood that our invention is not to be limited to the specific constructions and arrangements shown and described except only insofar as the claims may be so limited as it will be apparent to those skilled in the art that changes may be made without departing from the principles of the invention.

We claim:

1. A method of manufacturing a cylindrically shaped part having an outer annular surface with an axial slot in said surface, said slot having sidewalls, a counter-bored cup-shaped end on said part having an annular wall and an inner annular surface spaced a predetermined distance from said outer annular surface comprising the step of passing a broach having teeth of increasing height across said part to cut said slot, said broach including means to cut a groove in each side wall at a depth from said outer annular surface corresponding to said predetermined distance whereby said cylindrically shaped part is substantially free of burrs in a zone defined as the junctures between said inner annular surface and said slot.

2. A method of manufacturing a cylindrically shaped part having an outer annular surface with an axial slot in said surface, said slot having sidewalls, a counter-bored cup-shaped end on said part having an annular wall and an inner annular surface spaced a predetermined distance from said outer annular surface comprising the step of passing a broach having teeth of increasing height across said part to cut said slot, said broach including teeth to cut a groove in each sidewall at a depth from said outer annular surface corresponding to said predetermined distance whereby said part is substantially free of burrs in a zone defined as the juncture between said inner annular surface and said slot.

3. A method of manufacturing a cylindrically shaped part having an outer annular surface with an axial slot in said surface, said slot having sidewalls, a counter-bored cup-shaped end on said part having an inner annular surface spaced a predetermined distance from said outer annular surface comprising the step of passing a broach having teeth of increasing height across said part to cut said slot, said broach also including teeth from said broach and operative to cut a V-shaped groove in each sidewall at a depth from said outer annular surface corresponding to said predetermined distance whereby said cylindrically shaped part will be substantially free of burrs in a zone defined as the junctures between said annular wall and said slot.

4. A broach for a cylindrically shaped part having an annular outer surface and a counter-bored cup-shaped end thereon forming an annular wall, said wall including an inner annular surface spaced a predetermined distance from said outer annular surface, said broach adapted to cut an axial slot in the outer annular surface of said part, said broach having a series of teeth of increasing height to cut said slot, said broach including means to cut grooves in the sidewalls of said slot at a height corresponding to said predetermined distance whereby said means will remove any burrs formed in a zone defined by the junctures of said slot and said inner annular surface.

5. A broach for a cylindrically shaped part having an outer annular surface and a counter-bored cup-shaped end thereon including an annular wall, said annular wall including an inner annular surface spaced a predetermined distance from said outer annular surface, said broach being adapted to cut an axial slot in the outer annular surface of said part, said slot extending to a depth greater than said predetermined distance, said broach having a series of teeth of increasing height to cut said slot and including a series of V-shaped teeth extending from said broach so as to cut V-shaped grooves in the sidewalls of said slot at a depth corresponding to said predetermined distance whereby any burrs will be removed which are formed in a zone defined by the junctures of said inner surface and said slot.

No references cited.

HARRISON L. HINSON, *Primary Examiner.*